May 18, 1937. E. STOUT 2,080,855
RECORDING MECHANISM FOR TRAINS
Filed Oct. 6, 1932 3 Sheets-Sheet 3
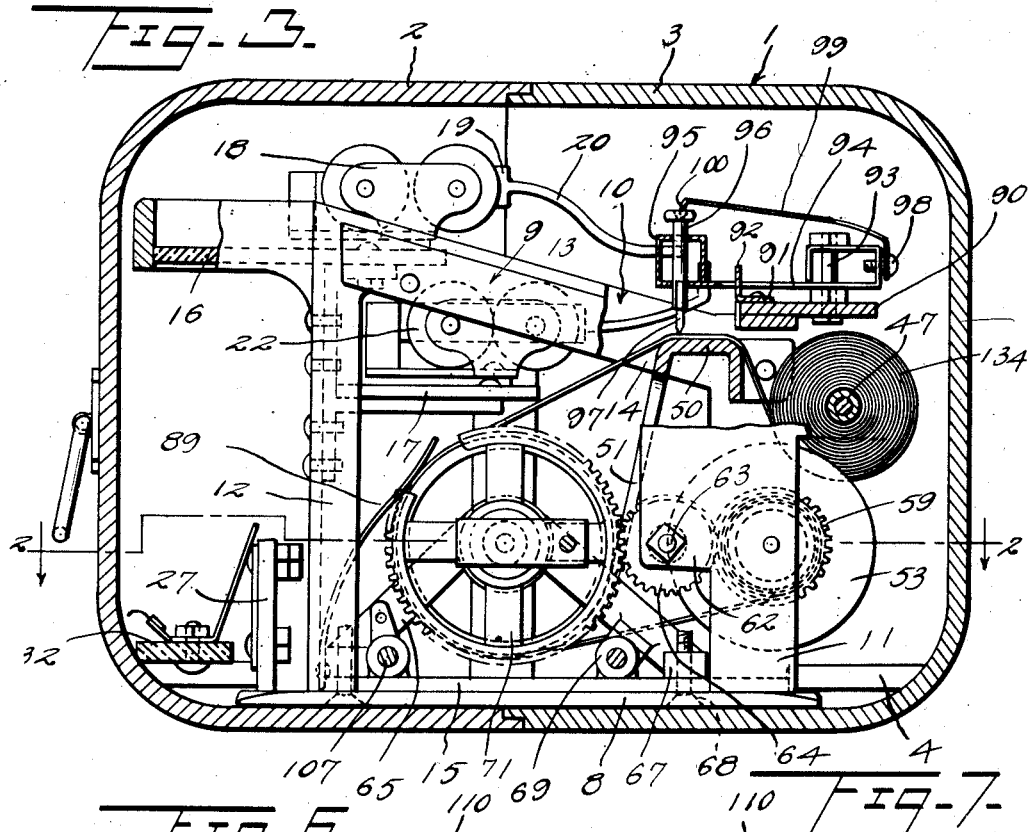
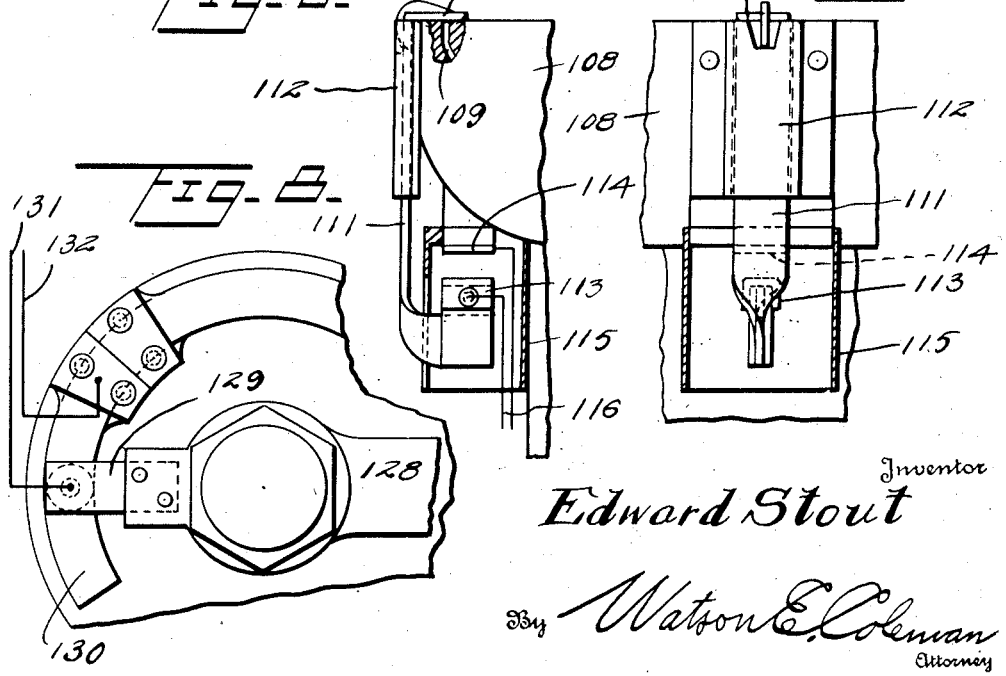
Inventor
Edward Stout
By Watson E. Coleman
Attorney Patented May 18, 1937

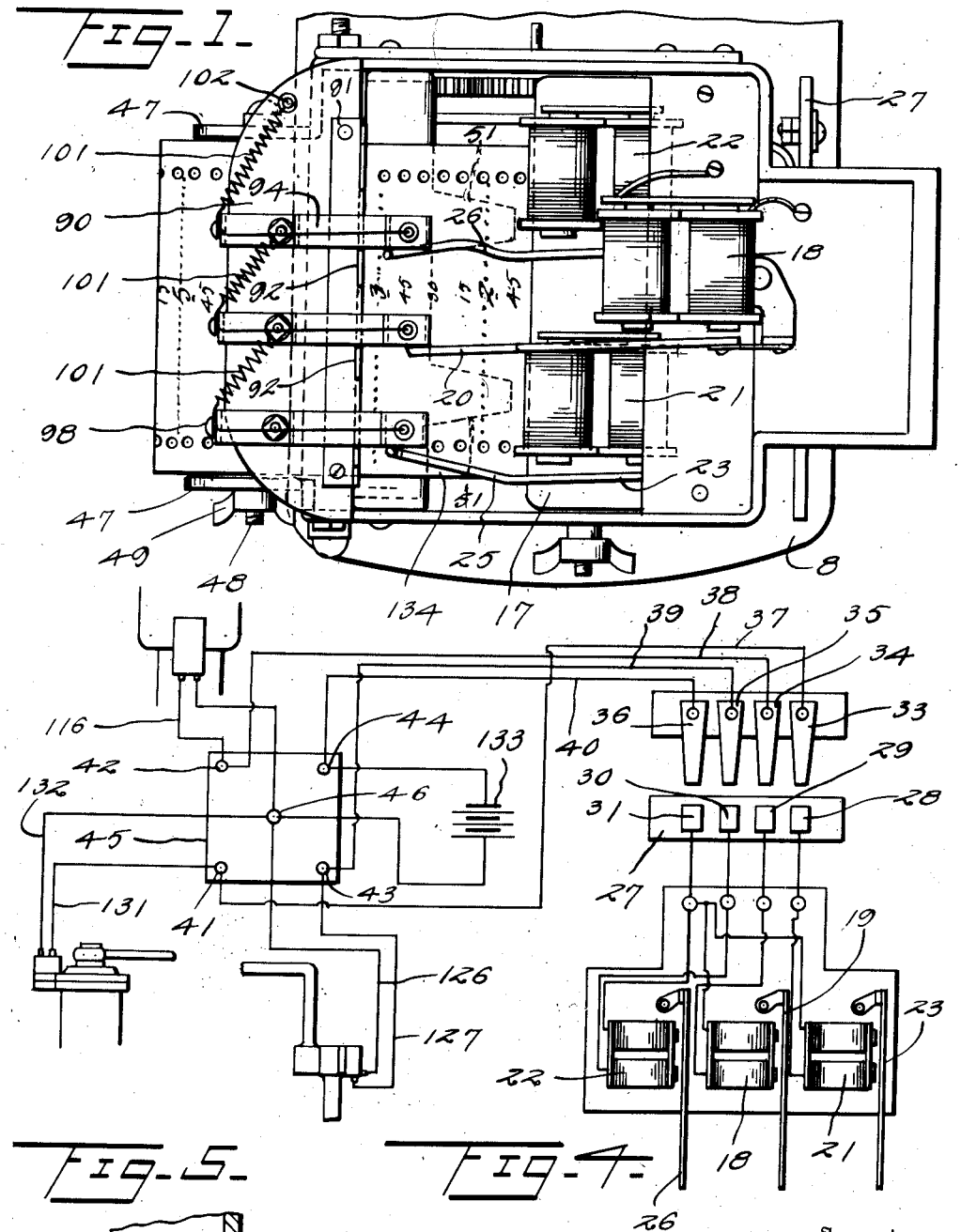

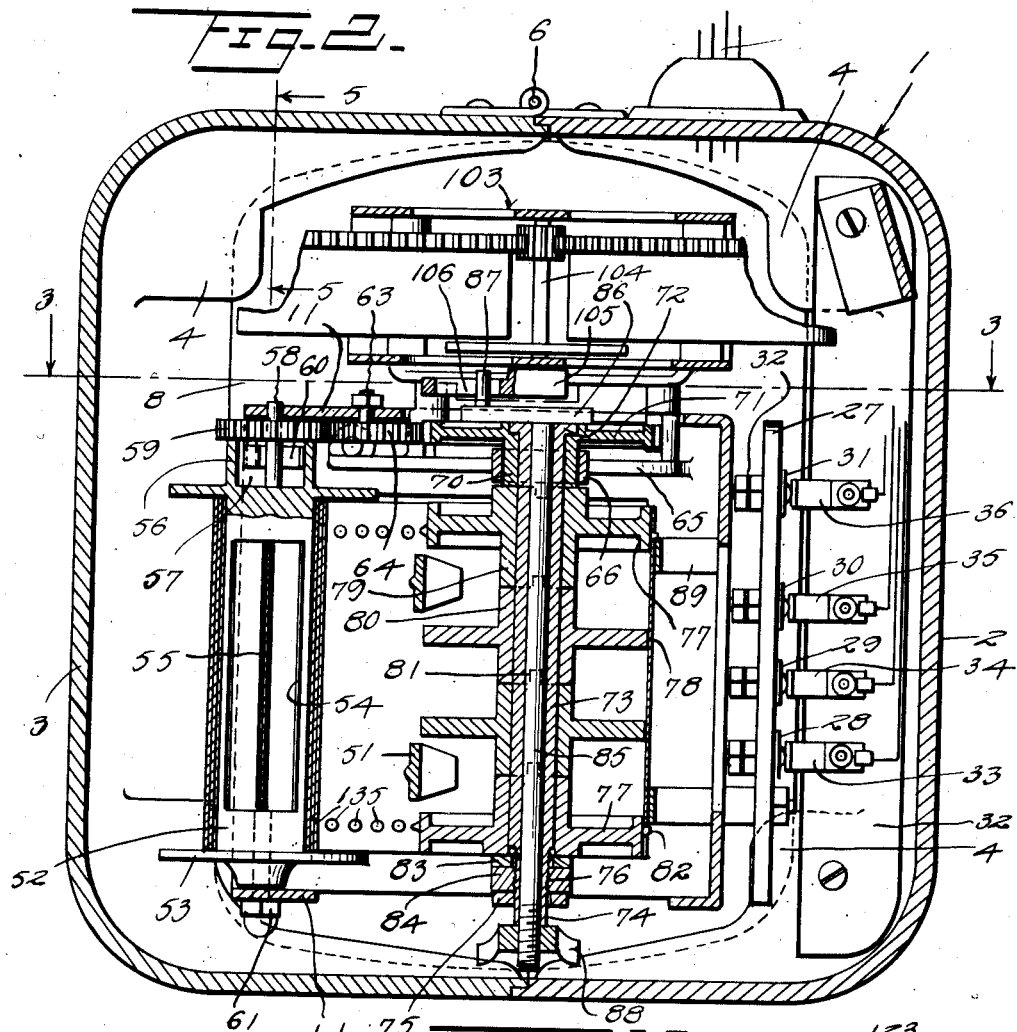

2,080,855

UNITED STATES PATENT OFFICE 2,080,855

RECORDING MECHANISM FOR TRAINS

Edward Stout, Burlington, Iowa; Alice Stout, executrix of said Edward Stout, deceased, assignor to Alice Stout, Burlington, Iowa Application October 6, 1932, Serial No. 636,591

4 Claims. (Cl. 242—55)

This invention relates to the class of recording devices and pertains particularly to a recorder designed for use upon railway trains or locomotives, particularly steam locomotives.

The primary object of the present invention is to provide a means whereby a permanent record will be made during the passage of a train from one point to another of all operations of certain instruments of the train, such for example as the locomotive whistle, bell, and emergency brake lever.

In the operation of trains it is frequently of extreme importance to know just at what periods the train whistle, bell or emergency brake lever has been operated, particularly where an accident has occurred. When there has been an accident, as for example, at a grade crossing, it is important to know whether the engineer of the train gave the required whistle or bell signal upon approaching said crossing and just at what time the application of the emergency brakes took place with respect to the giving of such a signal. Where no instrumental means is employed for recording the operation of these instruments dependence must be placed upon the evidence of persons who may have been at the scene of the accident and this is not always reliable.

With a device of the character herein employed a permanent record is made upon a tape at the instant that the whistle or bell is operated or the emergency brake lever actuated and as the records of these three instruments are made in side by side relation upon the tape it can be readily seen whether or not the signal was given before the application of the emergency brake and also there will be shown approximately the length of time elapsing between these operations.

From the foregoing it will be readily seen that another important object of the invention is to provide a mechanism for the purpose described which will give a permanent record upon a timed tape of the operation of the instruments of the train upon which the recording instrument is mounted, so that the same may be removed and employed as evidence, if desired.

A further object of the invention is to provide a recording instrument having novel means for actuating marking elements with respect to a record tape running at a timed speed past the marking implements, so that the exact time and location of the train may be determined at the time that the recorded instrument operation took place.

Still another object of the invention is to provide a novel means for conducting electrical impulses from the train whistle, bell or emergency brake lever when any one or all thereof are operated, to electrically actuated elements forming a part of the recording instrument which when actuated operate a marking implement for the making of the tape record.

A still further object of the invention is to provide in a recording instrument of the character herein described, a novel means for removably mounting the recording mechanism in a casing which is designed to be locked and sealed in the train for removal only by the properly authorized authorities, which mounting means is such that when the recording mechanism is placed in the casing and the latter closed the proper electrical connections will automatically be made between the electric impulse responsive devices in the instrument and the circuit closing means associated with the several instruments of the train.

The invention will be best understood from a consideration of the following detailed description taken in connection with the accompanying drawings forming part of this specification, with the understanding, however, that the invention is not confined to any strict conformity with the showing of the drawings but may be changed or modified so long as such changes or modifications mark no material departure from the salient features of the invention as expressed in the appended claims.

In the drawings:—

Figure 1 is a view in top plan of the recording mechanism embodying the present invention, showing the same removed from the housing and without the clock mechanism which is associated therewith;

Figure 2 is a horizontal sectional view through the recording instrument and housing taken substantially upon the plane of line 2—2 of Figure 3, but showing certain of the elements in this plane partly in elevation;

Figure 3 is a vertical sectional view taken substantially upon the line 3—3 of Figure 2;

Figure 4 shows the circuit diagram for the recording instrument;

Figure 5 is a sectional view taken substantially upon the line 5—5 of Figure 2;

Figure 6 is a view illustrating in side elevation the circuit closing mechanism associated with a steam whistle;

Figure 7 is a view in front elevation of the whistle circuit closing mechanism;

Figure 8 is a view in plan of a portion of the emergency brake lever of a train showing the circuit closing mechanism associated therewith;

Figure 9 illustrates the mechanism associated with the train bell for closing the electric circuit actuated thereby;

Figure 10 is a view in front elevation of the mechanism shown in Figure 9 with the cover structure therefor removed;

Figure 11 shows the locking mechanism for the recording instrument housing.

Referring now more particularly to the drawings wherein like numerals of reference indicate corresponding parts throughout the several views, the numeral 1 indicates generally a casing or box in which the recording mechanism is housed. This box is formed in two sections each of which is indicated by the numerals 2 and 3 and which may be referred to respectively as the lid and body. The box is of rectangular configuration and the bottom walls of the body 3 and of the lid 2 have the webs 4 formed across the corners thereof as shown in Figures 2 and 5 which are in spaced relation with the bottoms and form the pockets 5 for the purpose hereinafter described. The lid or cover 2 of the box is hingedly attached to the body as indicated by the numeral 6 in Figure 2 and the edges opposite the hinges are joined by a suitable fastener, such as is indicated by the numeral 7 in Figure 11, to which a seal may be attached so that the box after having been closed by an official of the train upon which the mechanism is mounted, may only be opened by one with the proper authority.

The recording mechanism of the present invention is mounted upon a base plate 8 which is roughly of rectangular design and which is adapted to be mounted in the body 3 of the casing or box which when the cover 2 is open, by being slipped rearwardly into the box so that each of two of its corners will engage in pockets 5 and the other corners will be so positioned that when the cover 2 is closed the bottom of the cover will slide under the base plate and these other corners will slip under the webs 4 of the cover into the pockets 5 thereof.

The recording mechanism consists of a frame structure having the sides 9 and 10 which generally consist of upright front posts 11, rear posts 12 and top bars 13 and 14. The bottom portions of the side frames are connected by a suitable rectangular base frame which is indicated generally by the numeral 15.

Mounted in horizontal position between the side frames 9 and 10 adjacent the tops thereof and to the rear of the frame structure are the platforms 16 and 17 which are formed of insulation material and upon the upper platform 16 is a two-coil electro-magnet which is indicated generally by the numeral 18 and which has the armature 19 which is oscillatably mounted for movement relative to the electro-magnets in the usual manner and which has the elongated extension 20. The lower platform carries two two-coil electro-magnets which are indicated by the numerals 21 and 22 and these have the armatures 23 and 24 respectively each of which is provided with an extension, as indicated by the numerals 25 and 26. The armature extensions from the three electro-magnets extend forwardly with respect to the instrument frame as is shown in Figures 1 and 3, the extension 20 of the upper armature curving downwardly slightly while the extensions of the lower armatures curve slightly upwardly so that their ends will be in nearly the same plane.

At the back of the frame structure adjacent the bottom thereof is a terminal board 27.

This board is vertically arranged as shown in Figure 3 and carries four vertically disposed metal contact strips which are indicated by the numerals 28, 29, 30 and 31 each of which is secured to the board in any suitable manner to facilitate the attachment of an electric wire thereto. The contact 31 is electrically connected, as shown in the diagram in Figure 4, with one side of each of the electro-magnets, while the other side of each magnet is connected with one of the other strips. As shown in Figure 4 the said other side of the magnet 22 is connected with the contact 30, that of the magnet 18 is connected with the contact 29 and the magnet 21 with the contact 28. These contacts 28 to 31 face outwardly with respect to the instrument supporting frame and when the instrument has been placed in position in the body of the housing they will be disposed to have other contacts brought into electrical connection therewith when the cover of the housing is closed. These other contacts which are supported upon a suitable insulation plate 32 carried by the cover 2, are indicated by the numerals 33, 34, 35 and 36 and electrically connect respectively with the contacts 28 to 31. To these contacts 33 to 36 inclusive are connected respectively the wires 37, 38, 39 and 40 which are respectively connected with terminal posts 41, 42, 43 and 44 upon a distributing board 45 which is located at any suitable place exteriorly of the recording mechanism and which has a fifth terminal post which is indicated by the numeral 46. The connections between the terminal posts 41 to 44 and 46 will be hereinafter more fully described.

The upper ends of the posts 11 have the integral forwardly projecting ears 47 between which extends a shaft 48 which has a head at one end and at its other end is screw-threaded to receive a thumb nut 49. Inwardly of the shaft 48 is mounted, between the posts 11, the horizontal table 50 from the inner edge of which there extends downwardly and rearwardly of the mechanism, the arms 51. Disposed at an elevation below the shaft 47 between the posts 11 is a drum 52 which at each end has formed integrally therewith the flanges 53. This drum is preferably of hollow construction and on one side is provided with the relatively large opening 54, while opposite this opening there is formed a slit 55, the purpose of which will be presently described. At one end the drum is provided with a hollow hub 56 which is open at its outer end forming the chamber 57 and extending axially through this chamber is a stub shaft 58 which passes through a suitable bearing aperture in the adjacent post 11. Mounted upon this stub shaft 58 and freely rotatable thereon is a gear 59 which at one side bears against the hub 56 and closes the same and this gear has secured to its inner face one end of a flat spring 60 which at its other end bears against the circular inner wall of the hub as is shown in Figure 2. This spring 60 forms a friction clutch between the hub of the drum and the adjacent gear. The opposite end of the drum is supported by the removable screw 61 which passes loosely through the adjacent post 11 and threads into the end of the drum adjacent thereto.

At one side of the instrument frame the post 11 is extended rearwardly as indicated at 62 and is provided with a suitable opening to receive a pivot pin 63 on which is mounted upon the inner side of the post the gear pinion 64. This pinion meshes with the gear 59. Upon the same side of the frame as the gears 59 and 64 is a bearing frame 65 which as shown in Figure 3 is in the form of two legs which are joined by a bearing sleeve 66 and from which they extend downwardly in divergent relation and terminate in the lateral ears 67 into which the screws 68 threadably engage after passing upwardly through the underlying frame structure 15 and the instrument carrying plate 8. In addition to the ears 67 the legs of the bearing frame 65 carry the two ear members 69 which are provided with threaded openings which are horizontally disposed or are directed laterally with respect to the instrument frame.

The bearing 66 has rotatably mounted therein the elongated hub portion 70 of a large gear 71 which as shown in Figures 2 and 3 meshes with the pinion 64. This gear hub 70 is enlarged slightly at its outer end to receive the head 72 of a tubular shaft 73 which passes through the hub and across the frame to the opposite side thereof where it terminates in the reduced portion 74 which passes through the upright post 75 at this side of the frame. Inside of the upright post 75 this reduced portion 74 of the tubular shaft 73 is screw-threaded as indicated at 76, while its outer portion which is smooth rotates in a suitable bearing opening in the post.

Mounted upon the tubular shaft 73 are the wheels 77 and 78.

There are two wheels 77 and between these are two of the wheels 78 and these wheels 77 and 78 have elongated hub portions 79 and 80 respectively which are connected together by the clutch teeth and sockets 81. The end of the hub of wheel 77 which abuts the hub 70 of the gear wheel 71 is connected with this gear wheel hub in the same manner so that as will be readily apparent the rotation of the gear 71 will impart rotary movement to the wheels 77 and 78. The wheels 77 as shown are relatively broad and their peripheries are provided with the lugs 82 for the purpose hereinafter stated.

Surrounding the threaded portion 76 of the tubular shaft 73 is a washer 83 which abuts the hub of the adjacent wheel 77 and abutting this washer is a nut 84 which is threaded onto the reduced portion 74 of the hollow shaft and as will be readily apparent holds the wheels 77 and 78 in locked engagement one with the other.

Passing through the hollow shaft 73 is an inner solid shaft 85 which upon the end adjacent the gear 71 connects with one end of a crank lever 86 which carries adjacent its other end the outwardly extending crank pin 87. This lever 86 abuts the adjacent end of the hub of the gear 71 and the head 72 of the hollow shaft and is held tightly in frictional engagement therewith by the thumb nut 88 which is threaded upon the other end of the shaft 85 which, as shown in Figure 2, projects from the reduced end of the tubular shaft 73. The thumb nut 88 bears against this reduced end as shown and thus effectively draws the shaft 85 into place.

Secured to the back part of the instrument frame structure adjacent the contact board 27 are two spring arms each of which is indicated by the numeral 89 each of which curves upwardly and forwardly and bears against the periphery of a toothed wheel 77.

Mounted between the side frames 9 and 10 of the instrument above the table 50 is a horizontal plate 90 which has its inner or rear edge positioned above the outer or front edge of the table. Secured along the inner edge of this plate 90 is a strip 91 which has the upwardly extending spaced stop members 92.

Mounted upon the plate 90 are three upright posts each of which is indicated by the numeral 93 and each of these passes through an inwardly or rearwardly extending arm 94. Each of the arms 94 rests upon a suitable underlying support and oscillates about its post 93 and from the post the arm extends rearwardly between a pair of the stops 92.

The inner or free end of each arm 94 is formed to provide the upright frame 95, the upper and lower sides of which are suitably apertured to receive the pencil carrying sleeve 96 in the lower end of which is a pencil 97. Attached by the screw 98 to the pivoted end of each arm is a spring wire 99 which extends rearwardly over the top of the arm 94 and has its free end turned downwardly as indicated at 100 for engagement in the upper end of the pencil carrying sleeve 96. This spring normally tends to move downwardly and thus urges the pencil 97, which is beneath its free end, downwardly against the table 50.

Each of the arms 94 is normally held in the position shown in Figure 1 by a spring 101. Each of the springs is connected at one end with the screw 98 of an arm and two thereof are connected with the adjacent pivot posts while the third extends laterally to and connects with a pin 102 mounted upon the plate 90.

As shown in Figure 1 each of the arms 94 has the terminal of the extension of an electro-magnet armature arm disposed against one side of the pencil frame thereof so that upon the energization of any one of the magnets the movement of the armature thereof will effect the lateral swinging of the adjacent pencil arm.

Mounted upon the base 8 at the side of the frame structure upon which the gears are located, is a clock-work mechanism which is indicated generally by the numeral 103. Any suitable clockwork mechanism is employed and the main shaft 104 thereof carries an arm 105 which is provided with a longitudinal slot 106 in which is positioned the crank pin 87. This mechanism 103 is preferably held against the frame of the other mechanism by suitable securing screws 107 which secure the frame of the clock mechanism against the ears 69 into which the screws engage.

As previously stated the electro-magnets are energized through the actuation of the whistle, bell and emergency brake lever of the train upon which the recording mechanism is mounted. For the closing of the proper circuit upon the actuation of the engine whistle the whistle base which is indicated by the numeral 108 in Figures 6 and 7 is provided with a suitable steam passage 109 over which is normally located the laterally turned end 110 of a slide member 111.

This member is connected with the whistle base by a suitable guide plate 112 which permits it to have free vertical movement. The lower end of the slide member 111 is turned inwardly and carries a metal contact 113 and normally disposed directly above this contact and upon the whistle base from which it is suitably insulated is a fixed contact 114. One of these contacts, as for example the fixed contact 114, is electrically connected by the wire 115 with the terminal post 40 of the distributor plate 45 and the other contact is connected by the wire 116 with the terminal post 42 which is electrically connected with the electro-magnet 18.

The locomotive bell operates one of the electro-magnets when it is swung, in the following manner. The pivot pin 117 which oscillates in the supporting post 118 has secured in its end the pin 119 which carries a pair of spaced ears each of which is indicated by the numeral 120. Supported upon a pin 121 which extends across between these ears is an arm 122 upon the upper end of which is carried a roller 123. A suitable spring 124 engages this arm and normally draws it inwardly toward the adjacent end of the post in which the pin 117 oscillates.

Secured to the circular face of the post 118 concentric with the pin 117 are two arcuate contact plates 125 the ends of which are in spaced relation, as shown in Figure 10. These plates are suitably insulated from the adjacent post body and when the engine bell is idle the arm or pin 122 will extend directly upwardly and the metal roller 123 will be located directly between the spaced upper ends of these plates.

The metal roller 123 is connected by the wire 126 with one of the contacts upon the distributor board 45, such for example as the center contact 46, while the plates 125 are electrically connected by the wire 127 with the terminal post 43. These wires electrically connect the switch structure just described which is operated by the swinging of the engine bell, with the electro-magnet 22.

The emergency brake lever of the train which is shown conventionally and indicated by the numeral 128 in Figure 8, is equipped with a metal contact 129 which is so disposed that when the brake lever is in applied position for the emergency application of the train brakes it will come into electrical contact with the plate 130. This plate has a wire 131 connected therewith which may lead to the terminal 41 while the contact finger 129 which moves with the lever is connected by the wire 132 with the central terminal 44 of the distributor plate. This emergency brake lever is thus connected with the electro-magnet 21.

A suitable source of current supply is indicated by the numeral 133 and one side of this is connected with the terminal post 44 of the distributor plate while the other side is connected with the central post 46 thereof.

It will thus be seen that current will be supplied from this source through the wire 40 to the contact plate 31 from which wires lead to each of the electro-magnets and when the switch associated with either the whistle, bell or emergency brake lever is closed current will flow from the battery through the contact plate 31 to the appropriate electro-magnet and pass back therefrom through the switch associated with the train element which has been operated to the center contact post 46 of the distributor plate and from there to the battery.

In the operation of the present recording mechanism the unit is placed as a whole within the housing 1 as previously described, so that the shiftable contacts 33 to 36 will be brought into engagement with the contact plates 28 to 31 when the housing is closed. Previous to the placing of the mechanism within the housing a roll of record paper 134 is placed upon the shaft 48 and the paper is trained over the top of the table 50 between the same and the pencils 97 and then around the wheels 77 and 78 from which it is brought back across the under side of and secured to the drum 52. This record paper is provided along its margins with the apertures 135 in which the teeth or lugs 82 of the wheels 77 engage and the surface of the tape may be transversely marked to indicate hour spaces, each marking having an hour figure noted thereon. Between the hour markings figures may be placed to divide the same into quarter, half and three-quarter periods.

After the mechanism has been placed in the casing and the latter locked the time mechanism may be set to start with the train or the time mechanism may be kept running continuously with the pencil positions upon the marked tape corresponding with respect to the hour and quarter hour figures thereon with the actual time of the day. It will thus be seen that during the running period of the train the time of operation of the whistle, bell or emergency brake lever will be accurately recorded upon the tape 134 through the lateral movement of the appropriate one of the pencils 97 and the making of a check on the tape in the line which is normally formed thereon parallel with the edges. As previously stated, the closing of one of the circuit closers associated with the bell, whistle or emergency brake lever will supply energy to the associate electro-magnet and this will result in the lateral movement of the magnet armature which will force over the arm 94 with which it is constantly in engagement and thus cause a short check to be formed on the tape transversely thereof.

From the foregoing it will be readily apparent that with a device of the character herein described an accurate record can be made of all happenings during the run of a train where the whistle, bell or emergency brake lever is involved, and it will also be readily apparent that the recording mechanism herein set forth may be effectively employed for recording other events in the run of a train.

Having thus described the invention, what is claimed is:—

1. In a recorder employing a record receiving tape, and a driving unit, means for moving said tape comprising a tape roll supporting shaft, a tape wind-up drum, a gear connected with said drum, a power shaft, means coupling the driving unit with the power shaft, a tubular shaft having the power shaft extending therethrough and coupled therewith, a gear on the tubular shaft coupled with said first gear, and a plurality of wheels upon and connected with the tubular shaft to turn therewith, said wheels having the tape passing over and engaging therewith to effect the unwinding of the tape from said roll.

2. In a recorder employing a record receiving tape, and a driving unit having a drive shaft, means for moving said tape comprising a tape roll supporting shaft, a tape wind-up drum, a gear connected with said drum, a power shaft, means coupling the driving unit shaft with the power shaft, a tubular shaft having the power shaft extending therethrough and coupled therewith, a gear on the tubular shaft coupled with said first gear, a plurality of wheels upon the tubular shaft over which the tape passes, and means securing said wheels in hub abutting frictional engagement.

3. In a recorder employing a record receiving tape, and a driving unit having a driving shaft, means for moving said tape comprising a rotatably mounted shaft for supporting a tape roll for unwinding, a wind-up drum to which said tape runs and upon which the tape is wound, said drum having an open hub at one end, a shaft passing through the drum and hub, a gear upon said shaft adjacent the open end of the hub, frictional means carried by the gear and disposed within and contacting the inner wall of the hub, a power shaft, a tubular shaft having the power shaft passing therethrough, a gear upon said tubular shaft having operative connection with said first gear, a series of wheels mounted upon the tubular shaft and having hubs in abutting relation one with the other and one of said hubs being in abutting relation with the second named gear, said wheels having the tape pass thereabout, means for coupling the drive shaft with the driving unit, and means carried by the drive shaft for securing the tubular shaft, the wheels and the adjacent gear together.

4. In a recorder employing a record receiving tape, a tape roll supporting shaft and a drum upon which the tape is wound, a power mechanism, means forming a frictional coupling between the power mechanism and the drum, and a tape moving unit interposed between the roll carrying shaft and the drum comprising a shaft, a positive driving connection between said last shaft and the power unit, a sleeve surrounding the last shaft, a plurality of wheels having hubs through which said sleeve passes, said hubs being in end abutting relation, and means carried by the sleeve for effecting the drawing together of the hubs of said wheels.

EDWARD STOUT.